(12) United States Patent
Wodrich et al.

(10) Patent No.: US 12,449,534 B2
(45) Date of Patent: Oct. 21, 2025

(54) VEHICULAR RADAR SENSOR WITH CROSS CHANNEL ISOLATION

(71) Applicant: Magna Electronics Inc., Auburn Hills, MI (US)

(72) Inventors: Helmut Arnold Hardow Wodrich, Clarkston, MI (US); Walter Gordon Woodington, Lincoln, MA (US); Suresh Boddi, New Hudson, MI (US); Holger Hess, Aschaffenburg (DE); Danny A. Schram, Clarkston, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 415 days.

(21) Appl. No.: 17/815,632

(22) Filed: Jul. 28, 2022

(65) Prior Publication Data

US 2023/0035968 A1    Feb. 2, 2023

Related U.S. Application Data

(60) Provisional application No. 63/203,732, filed on Jul. 29, 2021.

(51) Int. Cl.
*G01S 13/931*    (2020.01)
*H01Q 1/32*    (2006.01)
(Continued)

(52) U.S. Cl.
CPC ......... *G01S 13/931* (2013.01); *H01Q 1/3233* (2013.01)

(58) Field of Classification Search
CPC ........ G01S 13/931; G01S 13/00; G01S 13/93; G01S 7/00; G01S 7/02; G01S 7/03; H01Q 1/3233; H01Q 1/525; H01Q 1/32; H01Q 1/38; H01Q 13/00; H05K 1/00; H05K 1/02; H05K 1/11; H05K 3/00; H05K 3/40; H01L 23/48; H01L 23/49; H01P 3/00; H01P 5/00; B60R 11/02
USPC ...... 342/70–72, 368–384, 175; 343/700 MS, 343/846, 897, 898, 899; 361/748–751; 174/250–268; 455/39; 703/1
See application file for complete search history.

(56) References Cited

U.S. PATENT DOCUMENTS 6,587,186 B2    7/2003    Bamji et al.
6,674,895 B2    1/2004    Rafii et al.
(Continued)

*Primary Examiner* — Vladimir Magloire
*Assistant Examiner* — Remash R Guyah
(74) *Attorney, Agent, or Firm* — HONIGMAN LLP

(57) ABSTRACT

A vehicular radar sensing system includes a radar sensor that includes (i) at least one transmitter that transmits radio signals, and (ii) at least one receiver that receive radio signals. The radar sensor includes a waveguide antenna and a printed circuit board (PCB) with a transmitter pad and a receiver pad. The transmitter transmits radio signals to the transmitter pad, and the receiver receives radio signals from the receiver pad. The PCB includes a ground plane layer and a plurality of conductive elements that at least partially surrounds at least the transmitter pad. The plurality of conductive elements electrically connects the waveguide antenna to the ground plane layer and attaches the PCB to the waveguide antenna. The waveguide antenna (i) guides the transmitted radio signals from the transmitter pad to the exterior environment and (ii) guides reflected radio signals from the exterior environment to the receiver pad.

20 Claims, 7 Drawing Sheets

(51) Int. Cl.
    *G01S 13/933*     (2020.01)
    *H01P 5/12*     (2006.01)
    *H01P 5/20*     (2006.01)
    *H04B 5/00*     (2024.01)
    *H04B 7/24*     (2006.01)

(56) References Cited

U.S. PATENT DOCUMENTS

| | | |
|---|---|---|
| 6,678,039 B2 | 1/2004 | Charbon |
| 6,690,354 B2 | 2/2004 | Sze |
| 6,710,770 B2 | 3/2004 | Tomasi et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 8,013,780 B2 | 9/2011 | Lynam |
| 8,027,029 B2 | 9/2011 | Lu et al. |
| 8,983,370 B2 * | 3/2015 | Tsukagoshi ............ H02J 50/70 455/39 |
| 9,036,026 B2 | 5/2015 | Dellantoni et al. |
| 9,142,872 B1 * | 9/2015 | Izadian .................... H01P 3/00 |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 9,869,762 B1 | 1/2018 | Alland et al. |
| 9,954,955 B2 | 4/2018 | Davis et al. |
| 10,866,306 B2 | 12/2020 | Maher et al. |
| 11,294,028 B2 | 4/2022 | Gentili et al. |
| 11,454,719 B2 | 9/2022 | Hess et al. |
| 12,013,480 B2 | 6/2024 | Hess et al. |
| 2010/0245066 A1 | 9/2010 | Sarioglu et al. |
| 2012/0050125 A1 | 3/2012 | Leiba et al. |
| 2015/0346322 A1 | 12/2015 | Schmalenberg et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2019/0124238 A1 | 4/2019 | Byrne et al. |
| 2019/0124243 A1 | 4/2019 | Mleczko et al. |
| 2019/0306966 A1 | 10/2019 | Byrne et al. |
| 2019/0339382 A1 | 11/2019 | Hess et al. |
| 2019/0348746 A1 | 11/2019 | Gupta et al. |
| 2020/0001787 A1 | 1/2020 | Lu et al. |
| 2020/0033549 A1 | 1/2020 | Liu et al. |
| 2020/0137926 A1 | 4/2020 | Wohlte |
| 2020/0166637 A1 | 5/2020 | Hess et al. |
| 2020/0271777 A1 * | 8/2020 | Vacanti ................ H01Q 1/3233 |

* cited by examiner

VEHICULAR RADAR SENSOR WITH CROSS CHANNEL ISOLATION

CROSS REFERENCE TO RELATED APPLICATION

The present application claims the filing benefits of U.S. provisional application Ser. No. 63/203,732, filed Jul. 29, 2021, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular radar sensing system includes a radar sensor configured to be disposed at a vehicle equipped with the vehicular radar sensing system so as to sense exterior of the vehicle. The radar sensor includes (i) at least one transmitter that transmits radio signals, and (ii) at least one receiver that receive radio signals. The radar sensor includes a waveguide antenna and a processor operable to process radio signals transmitted by the at least one transmitter and received by the at least one receiver. The radar sensor also includes a printed circuit board (PCB), and the PCB includes a transmitter pad and a receiver pad. The at least one transmitter, the at least one receiver and the processor are disposed at the PCB. The at least one transmitter transmits radio signals to the transmitter pad, and the at least one receiver receives radio signals from the receiver pad. The PCB includes a laminate construction having a plurality of conductive and dielectric layers laminated on a substrate. At least one layer of the plurality of conductive and dielectric layers includes a ground plane layer. The PCB includes a plurality of conductive elements and the plurality of conductive elements at least partially surrounds the transmitter pad and the receiver pad. The plurality of conductive elements electrically connects the waveguide antenna to the ground plane layer and attaches the PCB to the waveguide antenna. With the radar sensor disposed at the vehicle, the waveguide antenna (i) guides the transmitted radio signals from the transmitter pad to the exterior environment and (ii) guides reflected radio signals from the exterior environment to the receiver pad.

These and other objects, advantages, purposes and features of the present invention will become apparent upon review of the following specification in conjunction with the drawings.

DESCRIPTION OF THE PREFERRED EMBODIMENTS

Figure 1:
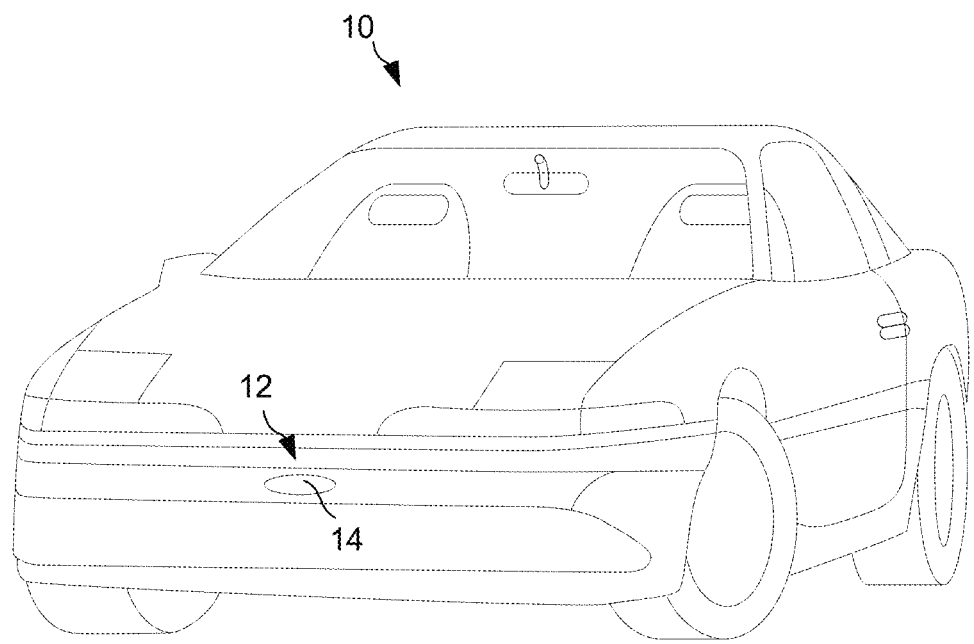
FIG. 1 is a perspective view of a vehicle with a sensing system that incorporates a radar sensor.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) that includes a data processor that is operable to process data captured by the radar sensor(s). The sensing system may also include a radar sensor that includes plurality of transmitters that transmit radio signals via plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controls at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Figure 2:
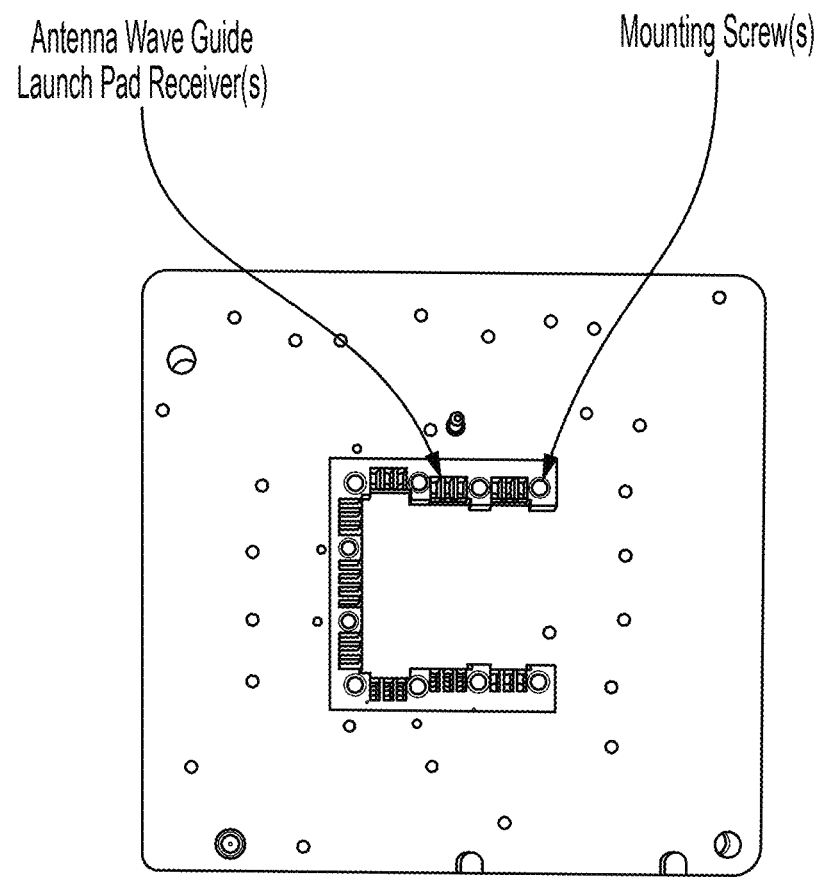
FIG. 2 is a top view of an antenna waveguide with a launch pad and mounting screws.
Figure 2:
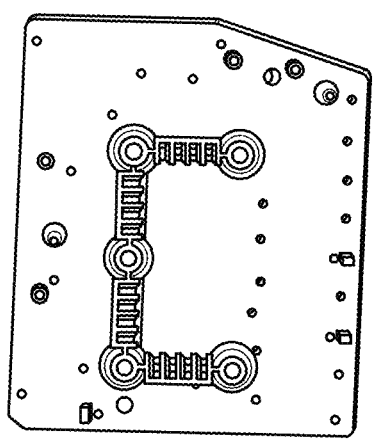
Figure 3:
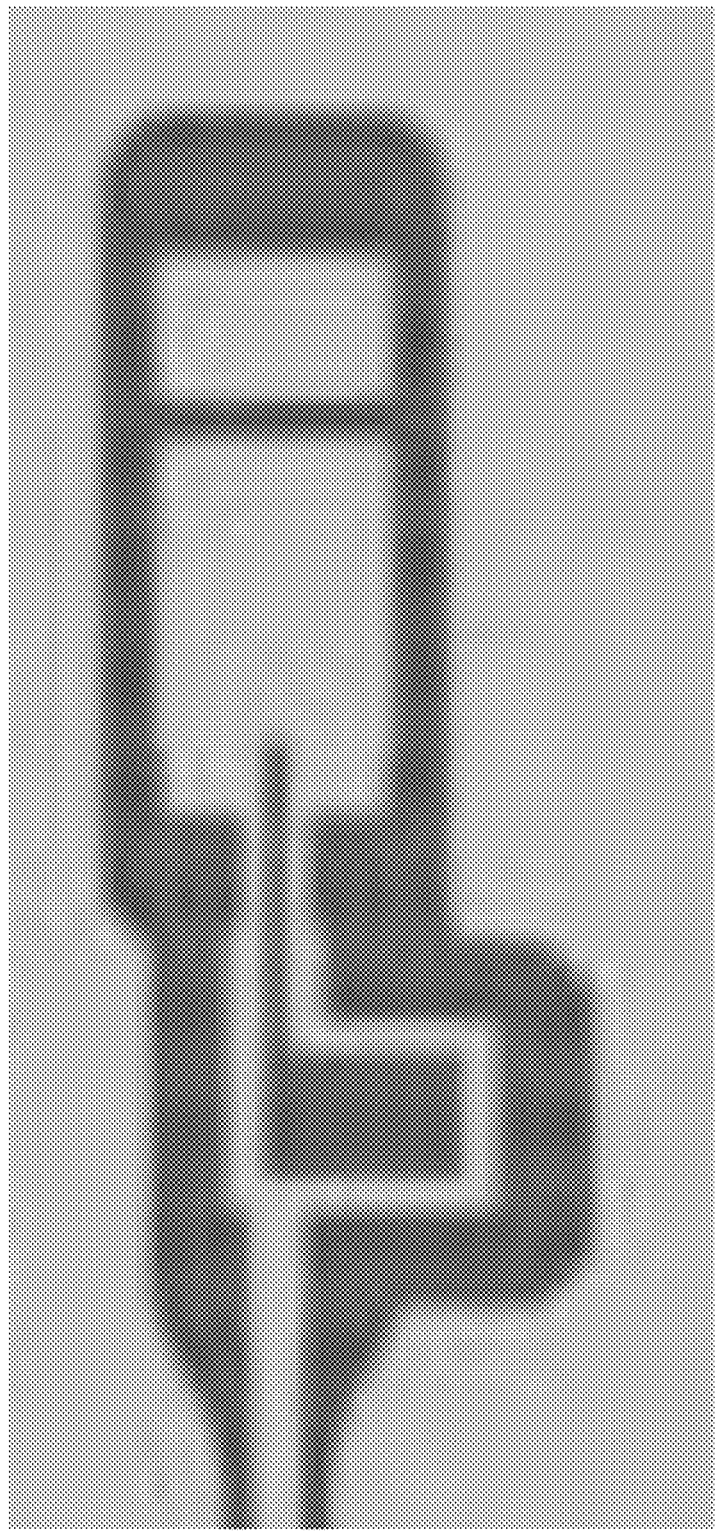
FIG. 3 is a schematic view of the antenna waveguide of FIG. 2.
Figure 4:
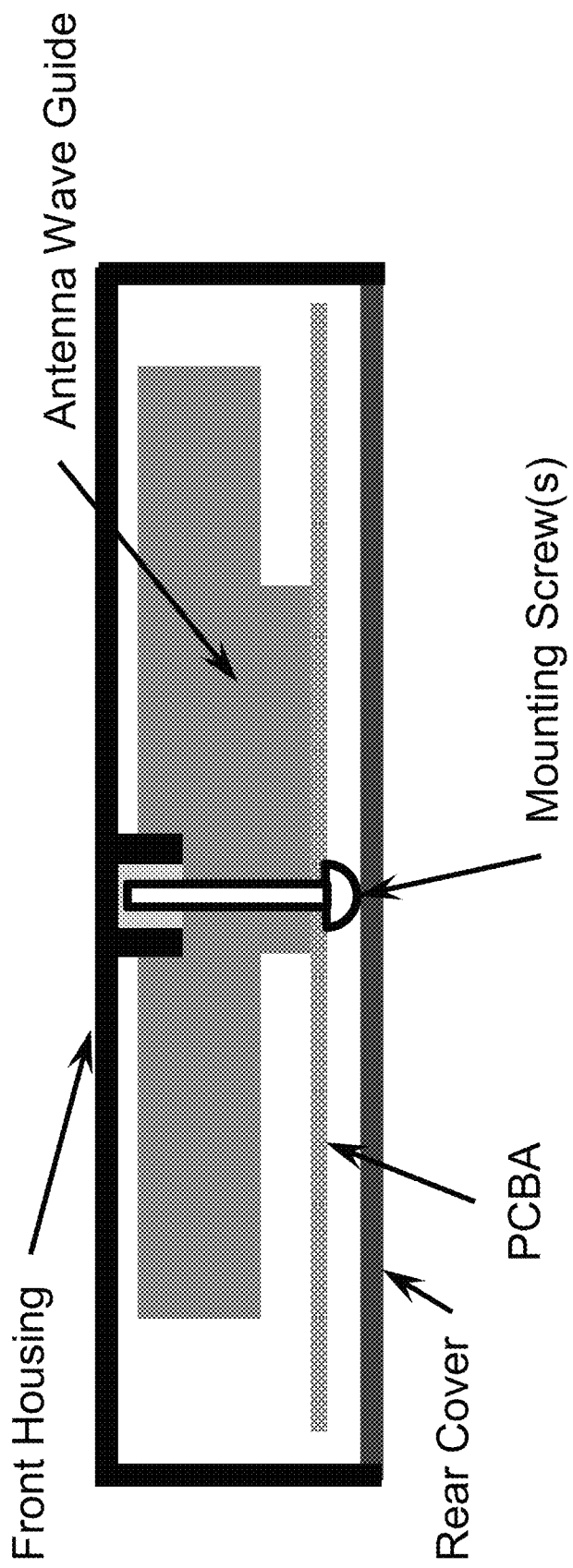
FIG. 4 is a schematic view of the antenna waveguide of FIG. 2.

Referring now to FIGS. 2-4, conventional radar construction includes a radar sensor or module (such as the radar sensor unit 14) that includes a front housing and rear housing that encompass a printed circuit board assembly (PCBA) and a waveguide antenna structure. The PCBA is typically attached to the waveguide using one or more screws to the front housing. The screw(s) apply clamp load to ensure mechanical connection and prevent radio frequency (RF) leakage between launch pads 52 (i.e., one or more pads (such as copper pads) disposed on the PCBA where RF signals are transmitted from and/or received at). Each launch pad may "launch" (i.e., radiate) signals from the transmitter and/or receive signals from the environment. The PCBA may have independent launch pads for each transmitter/receiver combination or may combine the transmitter pad and receiver pad into a single common pad. Such leakage between launch pads (i.e., multiple transmit and receive channels) reduces the signal to noise ratio (SNR) of the radar. Lower SNR is undesirable as it generally has a negative impact on range performance.

Figure 5:
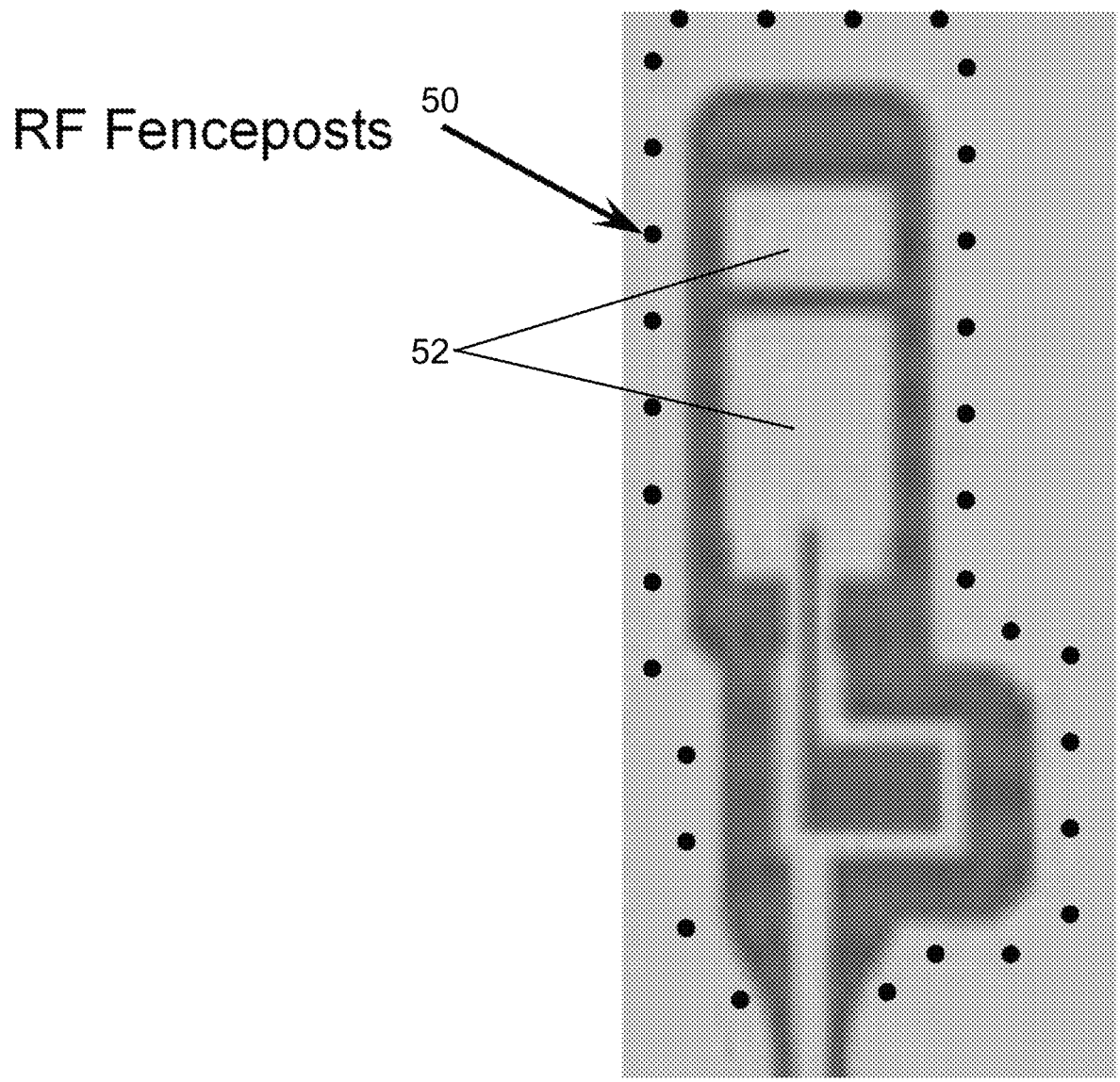
FIG. 5 is a schematic view of an antenna waveguide with a plurality of conductive structures.

Referring now to FIG. 5, implementations herein include a radar sensor or module with cross channel isolation of a launch pad structure. The radar module includes a series of metallic structures 50 (i.e., "fence posts") to isolate and at least partially encapsulate/surround each RF launch pad. These RF fence posts 50 connect a metallic layer (e.g., copper, aluminum, etc.) of the antenna waveguide with cylindrical or other shaped "posts" or rods to ensure an electrical connection to a ground plane of the PCBA. For example, the waveguide may include a metallic or other conductive layer (e.g., an exterior layer) that guides RF signals between the PCB and the waveguide outlet or antenna. The spacing of the fence posts 50 surround or partially surround the RF leakage caused by gaps in a joint of the PCBA and antenna waveguide by creating a magnetic field that generates a "fence" around the launch pad to provide cross channel isolation of the launch pad structure. That is, the fence reduces or eliminates RF leakage from one channel (i.e., launch pad structure) interfering with a different channel (i.e., a different launch pad structure).

Figure 6:
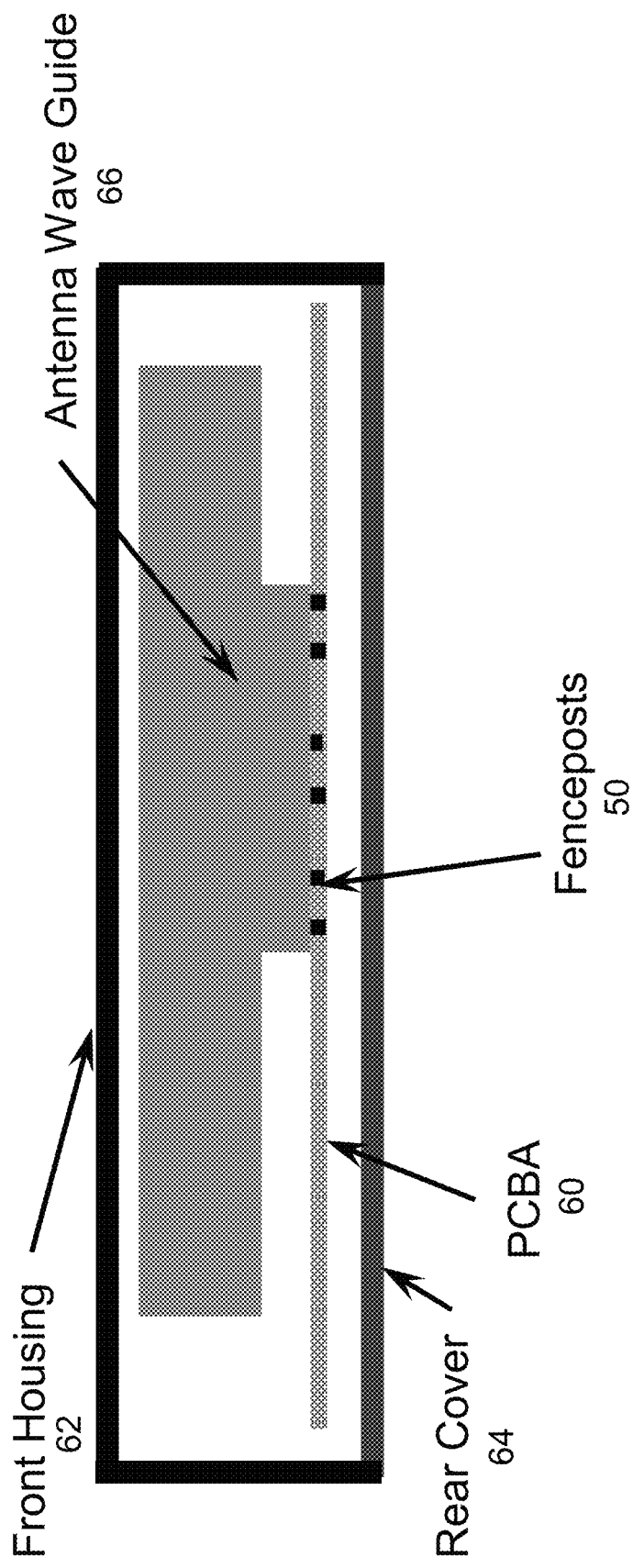
FIG. 6 is a schematic view of the antenna waveguide of FIG. 5.
Figure 7:
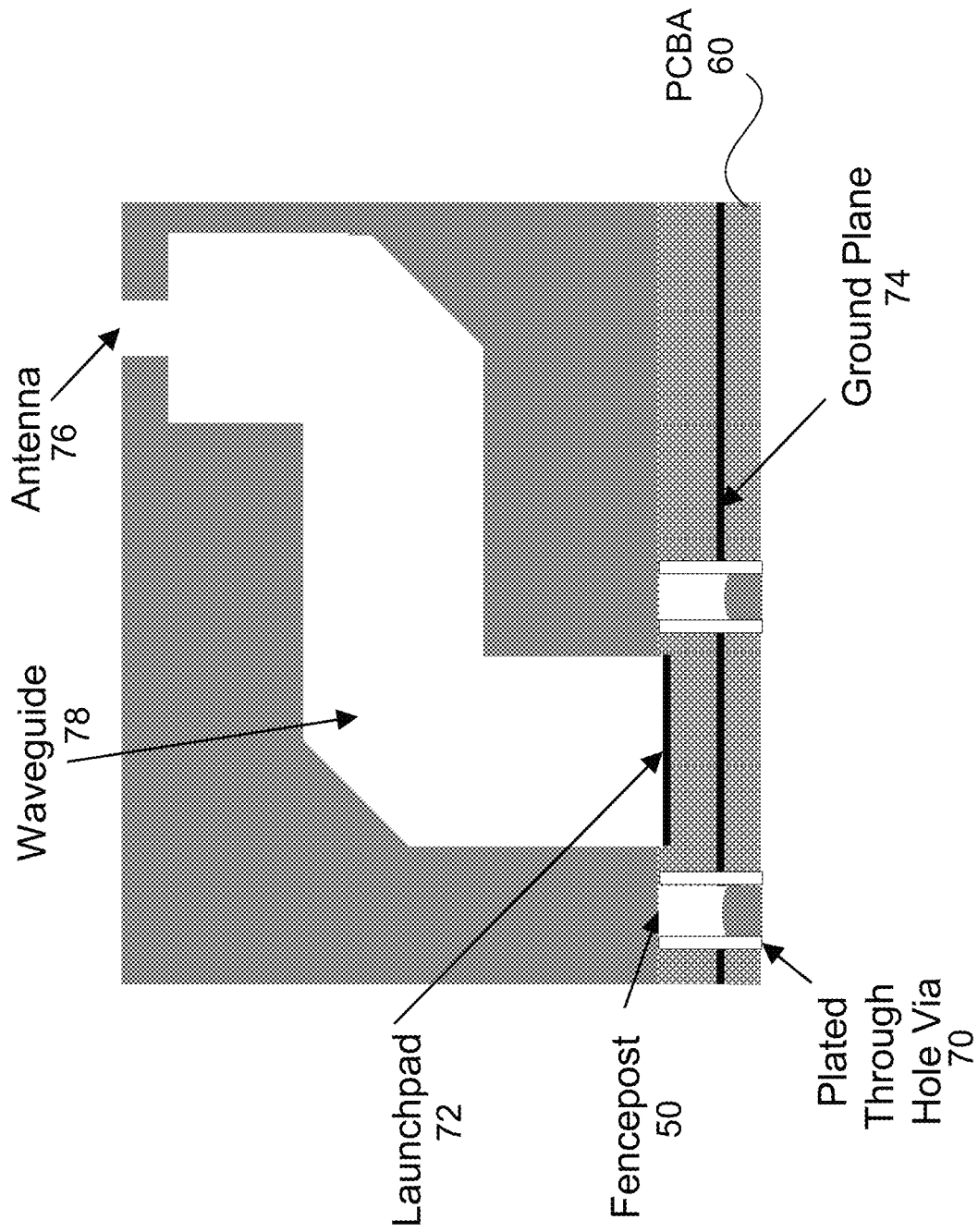
FIG. 7 is a cross-section of the antenna waveguide of FIG. 5.

Referring now to FIGS. 6 and 7, the fence posts 50 may be created by filling plated through-hole vias 70 (FIG. 7) in the PCBA 60 (FIGS. 6 and 7) with solder, creating a bond to the metallic layer of the antenna waveguide 78. Each via is a vertical interconnect (e.g., plated with copper) that facilitates electrical connections between layers (i.e., conductive and dielectric layers) of the PCB. For example, the PCB may comprise a laminate construction with a plurality of layers laminated on a substrate. The layers may include one or more conductive layers (e.g., signal layers, ground plane layers, etc.) and one or more dielectric layers. A through-hole via may extend from one surface or side of the PCB through to the other side or surface of the PCB (i.e., traverses each layer of the PCB). Optionally, the fence posts 50 are created during a joining process whereby the PCBA 60 is held under clamp loading to the antenna waveguide 78 during soldering. While clamped, solder may be applied to each via 70 surrounding the launch pad 72 using a laser or similar method to liquefy the solder (e.g., from the opposite side the PCBA 60 from the antenna waveguide 78) and ensure a mechanical bonding to the antenna waveguide 78 and the via 70 of the PCBA 60.

Optionally, screws are eliminated from clamping the PCBA 60 to the waveguide 78. Instead, clamp force is controlled via preloaded clamping force during assembly. Solidification of the solder provides sinkage, which maintains the joint between the PCBA 60 and the waveguide 78 in tension. A controlled quantity of solder may be released at each through-hole via 70 in order to maintain equivalent height of each fence post 50. For example, additional solder may increase the height of the fence post 50 (i.e., by filling the through-hole via 70 with additional solder). The launch pad 72 may be optically aligned with the antenna waveguide 78 to optimize alignment of multiple transmit and receive ports. Alignment may be confirmed via monitoring RF energy during transmissions.

Thus, the radar module includes a plurality of metallic structures (i.e., fence posts) that surround one or more RF launch pads. The fence posts replace conventional mounting methods (e.g., screws) by bonding the PCBA directly to the antenna waveguide. For example, each fence post includes a via (e.g., a through-hole via) that is filled with solder that bonds the PCBA to a metallic layer of the antenna waveguide. In addition to bonding the waveguide to the PCBA, the fence posts provide a "barrier" that helps isolate the launch pad and reduce or eliminate cross channel RF leakage. Thus, the radar module includes construction and performance benefits. For example, the module includes permanent connection of the waveguide to RF transmission and launch structures and elimination of mounting screws. Additionally, the radar module is a self-contained assembly that supports ease of integration into other subassemblies. The radar module provides consistency of clamp load and increased isolation of each RF transmitter and receiver combination. The radar module provides increased signal to noise ratio via elimination or reduction of cross channel coupling.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:
    a radar sensor configured to be disposed at a vehicle equipped with the vehicular radar sensing system so as to sense exterior of the vehicle;
    wherein the radar sensor comprises (i) at least one transmitter that transmits radio signals, and (ii) at least one receiver that receives radio signals;
    wherein the radar sensor comprises a waveguide antenna;
    wherein the radar sensor comprises a processor operable to process radio signals transmitted by the at least one transmitter and received by the at least one receiver;
    wherein the radar sensor comprises a printed circuit board (PCB), and wherein the PCB comprises a transmitter pad and a receiver pad, and wherein (i) the transmitter pad comprises a first conductive pad disposed at an outer surface of the PCB and (ii) the receiver pad comprises a second conductive pad disposed at the outer surface of the PCB, and wherein the transmitter pad is separate and distinct from the receiver pad;
    wherein the at least one transmitter transmits radio signals to the transmitter pad, and wherein the at least one receiver receives radio signals from the receiver pad;
    wherein the PCB comprises a laminate construction having a plurality of conductive and dielectric layers laminated on a substrate, and wherein at least one layer of the plurality of conductive and dielectric layers comprises a ground plane layer;
    wherein the PCB comprises a plurality of metallic structures, and wherein the plurality of metallic structures at least partially surrounds the transmitter pad on at least three sides of the transmitter pad on the outer surface of the PCB, and wherein the plurality of metallic structures at least partially surround the receiver pad on at least three sides of the receiver pad on the outer surface of the PCB, and wherein each metallic structure of the plurality of metallic structures passes through a plurality of layers of the PCB and electrically connects the waveguide antenna to the ground plane layer, and wherein the plurality of metallic structures attaches the PCB to the waveguide antenna; and
    wherein, with the radar sensor disposed at the vehicle, the waveguide antenna (i) guides the transmitted radio signals from the transmitter pad to the exterior environment and (ii) guides reflected radio signals from the exterior environment to the receiver pad.

2. The vehicular radar sensing system of claim 1, wherein at least one metallic structure of the plurality of metallic structures is at least partially disposed in a through-hole via.

3. The vehicular radar sensing system of claim 2, wherein the through-hole via is plated with an electrically conductive material.

4. The vehicular radar sensing system of claim 2, wherein the through-hole via is least partially filled with solder.

5. The vehicular radar sensing system of claim 4, wherein the solder bonds the waveguide antenna to the PCB.

6. The vehicular radar sensing system of claim 5, wherein a laser liquefies the solder to bond the waveguide antenna to the PCB.

7. The vehicular radar sensing system of claim 1, wherein the plurality of metallic structures comprises a plurality of cylindrical metallic structures.

8. The vehicular radar sensing system of claim 1, wherein the plurality of metallic structures generates a magnetic field that reduces radio frequency (RF) leakage between the transmitter pad and a second transmitter pad of the radar sensor.

9. The vehicular radar sensing system of claim 1, wherein the waveguide antenna is bonded to the PCB by only the plurality of metallic structures.

10. The vehicular radar sensing system of claim 1, wherein a height of each metallic structure of the plurality of metallic structures is the same.

11. The vehicular radar sensing system of claim 1, wherein a height of each metallic structure of the plurality of metallic structures is based on an amount of solder disposed at the respective metallic structure.

12. A vehicular radar sensing system, the vehicular radar sensing system comprising:
    a radar sensor configured to be disposed at a vehicle equipped with the vehicular radar sensing system so as to sense exterior of the vehicle;
    wherein the radar sensor comprises (i) at least one transmitter that transmits radio signals, and (ii) at least one receiver that receives radio signals;
    wherein the radar sensor comprises a waveguide antenna;
    wherein the radar sensor comprises a processor operable to process radio signals transmitted by the at least one transmitter and received by the at least one receiver;
    wherein the radar sensor comprises a printed circuit board (PCB), and wherein the PCB comprises a transmitter pad and a receiver pad, and wherein (i) the transmitter pad comprises a first conductive pad disposed at an outer surface of the PCB and (ii) the receiver pad comprises a second conductive pad disposed at the outer surface of the PCB, and wherein the transmitter pad is separate and distinct from the receiver pad;
    wherein the at least one transmitter transmits radio signals to the transmitter pad, and wherein the at least one receiver receives radio signals from the receiver pad;
    wherein the PCB comprises a laminate construction having a plurality of conductive and dielectric layers laminated on a substrate, and wherein at least one layer of the plurality of conductive and dielectric layers comprises a ground plane layer;
    wherein the PCB comprises a plurality of vias, and wherein each via of the plurality of vias passes through a plurality of layers of the PCB, and wherein the plurality of vias at least partially surrounds the transmitter pad on at least three sides of the transmitter pad on the outer surface of the PCB, and wherein the plurality of vias at least partially surround the receiver pad on at least three sides of the receiver pad on the outer surface of the PCB, and wherein electrically conductive plating at the plurality of vias electrically connects the waveguide antenna to the ground plane layer, and wherein individual vias of the plurality of vias are at least partially filled with solder, and wherein the PCB bonds to the waveguide antenna at the plurality of vias; and
    wherein, with the radar sensor disposed at the vehicle, the waveguide antenna (i) guides the transmitted radio signals from the transmitter pad to the exterior environment and (ii) guides reflected radio signals from the exterior environment to the receiver pad.

13. The vehicular radar sensing system of claim 12, wherein the plurality of vias comprises a plurality of through-hole vias.

14. The vehicular radar sensing system of claim 12, wherein the individual vias of the plurality of vias are plated with copper.

15. The vehicular radar sensing system of claim 12, wherein the plurality of vias at least in part bonds the waveguide antenna to the PCB using the solder.

16. The vehicular radar sensing system of claim 12, wherein a laser liquefies the solder to bond the waveguide antenna to the PCB.

17. A vehicular radar sensing system, the vehicular radar sensing system comprising:

a radar sensor configured to be disposed at a vehicle equipped with the vehicular radar sensing system so as to sense exterior of the vehicle;

wherein the radar sensor comprises (i) at least one transmitter that transmits radio signals, and (ii) at least one receiver that receives radio signals;

wherein the radar sensor comprises a waveguide antenna;

wherein the radar sensor comprises a processor operable to process radio signals transmitted by the at least one transmitter and received by the at least one receiver;

wherein the radar sensor comprises a printed circuit board (PCB), and wherein the PCB comprises a first transmitter pad and a first receiver pad, and wherein (i) the first transmitter pad comprises a first conductive pad disposed at an outer surface of the PCB, and wherein (ii) the first receiver pad comprises a second conductive pad disposed at the outer surface of the PCB, and wherein the first transmitter pad and the first receiver pad each comprise separate and distinct conductive pads;

wherein the at least one transmitter transmits radio signals to the first transmitter pad, and wherein the at least one receiver receives radio signals from the first receiver pad;

wherein the PCB comprises a laminate construction having a plurality of conductive and dielectric layers laminated on a substrate, and wherein at least one layer of the plurality of conductive and dielectric layers comprises a ground plane layer;

wherein the PCB comprises a plurality of cylindrical metallic structures, and wherein the plurality of cylindrical metallic structures at least partially surrounds the first transmitter pad on at least three sides of the first transmitter pad on the outer surface of the PCB, and wherein the plurality of cylindrical metallic structures at least partially surround the first receiver pad on at least three sides of the first receiver pad on the outer surface of the PCB, and wherein each cylindrical metallic structure of the plurality of cylindrical metallic structures passes through a plurality of layers of the PCB and electrically connects the waveguide antenna to the ground plane layer, and wherein the plurality of cylindrical metallic structures attaches the PCB to the waveguide antenna;

wherein the plurality of cylindrical metallic structures generates a magnetic field that reduces radio frequency (RF) leakage between the first transmitter pad and the first receiver pad and a second transmitter pad or a second receiver pad of the radar sensor; and wherein, with the radar sensor disposed at the vehicle, the waveguide antenna (i) guides the transmitted radio signals from the first transmitter pad to the exterior environment and (ii) guides reflected radio signals from the exterior environment to the first receiver pad.

18. The vehicular radar sensing system of claim 17, wherein at least one cylindrical metallic structure of the plurality of cylindrical metallic structures is at least partially disposed within a through-hole via.

19. The vehicular radar sensing system of claim 18, wherein the through-hole via is plated with an electrically conductive material.

20. The vehicular radar sensing system of claim 18, wherein the through-hole via is least partially filled with solder.

* * * * *